Sept. 16, 1947.          R. D. HICKOK          2,427,528
LIGHT ACCEPTANCE APERTURE FOR LIGHT METERS
Filed Feb. 5, 1946

INVENTOR
ROBERT D. HICKOK
By Hyde, Meyer, Baldwin & Doran
ATTORNEYS

Patented Sept. 16, 1947

2,427,528

UNITED STATES PATENT OFFICE 2,427,528

LIGHT ACCEPTANCE APERTURE FOR LIGHT METERS

Robert D. Hickok, Bratenahl, Ohio, assignor to Cleveland Patents, Incorporated, a corporation of Ohio Application February 5, 1946, Serial No. 645,657

4 Claims. (Cl. 250—41.5)

This invention relates to meters for the measurement of light intensity, and more particularly to meters for evaluating the intensity of light received from an angular field of substantial extent.

One object of the invention is to provide an improved meter of the character indicated, whose light transmitting passage is of such form as to cause the meter to be capable of producing more accurate light value readings than heretofore could be secured by meters of otherwise comparable type.

A further object of the invention is to provide an improved light meter affected substantially only by light rays coming from the desired angular field of view for which the light acceptance aperture of the meter has been designed, thereby avoiding errors heretofore resulting from the effect of unwanted light rays originating outside of said desired field.

A further object of the invention is to provide a light meter having a light acceptance passage of novel wall contour, whereby to greatly minimize the possibility of transmitting single or multiple reflections from the walls of said passage to the light sensitive element, and whereby all or a major portion of unwanted rays from outside the desired angular field are directed away from the light measuring element.

Other objects and advantages of the present invention will be apparent from a study of the following specification in conjunction with the accompanying drawings, in which.

Light meters may be of various types, including so-called "comparison" meters, in which the accepted light is measured against a standard of comparison; "extinction" meters in which the accepted light is cut down by passage through various thicknesses or intensities of smoked glass, until the light seems to disappear, or to reach a certain standard of value; or "photo-electric" meters in which the accepted light strikes a light-sensitive cell, causing generation of an electric current, the intensity of which is indicated by a movable pointer or otherwise, and which current intensity is translated into terms of light intensity by means of suitable scales, dials, or other means of conversion. In all meters regardless of type, it is of paramount importance that the angular field scanned by the meter, when the latter is held in fixed position, be known, so that the results are reducible to terms of light intensity over a preselected or desirable known area. In the present specification I will describe my invention with reference to a single embodiment thereof, choosing for convenience the example of a photoelectric meter such as is used by photographers to determine shutter speeds and stop apertures, the principles here presented being applicable by those skilled in the art to meters of other specific types.

Photographers are familiar with the fact that a light meter should accept, for measurement, light rays originating in a field approximately commensurate with that to be registered on the film in their camera, namely, the angular field of the lens. If for example a portrait, a full length figure, or a still life composition is to occupy a substantial portion of the final picture, the light originating only in the corresponding and desired field of view should be accepted and measured by the meter. If the meter accepts, intentionally or otherwise, light from a considerably wider area, the light value recorded by the meter may be too high or too low, depending for example on the presence of a very bright area such as the sky, or perhaps a dark area, just outside the pictured area, with the result that the camera shutter is set too fast or too slow, respectively, for accurate results. The careful operator accordingly uses a meter having a desired field and a light acceptance angle assumed to be approximately equivalent to that of his camera lens, or at least uses the meter at such a distance, and with such mental corrections, that the result is satisfactory, it being understood that the angular field of a lens or of a light meter, measured in degrees, varies in units of area depending on distance, and that light intensity likewise varies in known manner according to a mathematical function of the distance from the light source.

Figure 1:
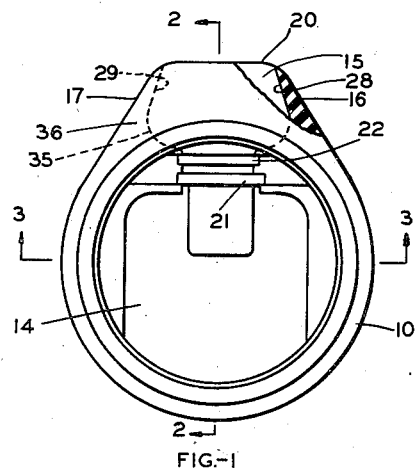
Fig. 1 is a plan view, with parts broken away and in section, showing a housing, a light acceptance aperture, and a light sensitive cell, all forming parts of a photo electric light meter embodying one form of my invention.
Figure 2:
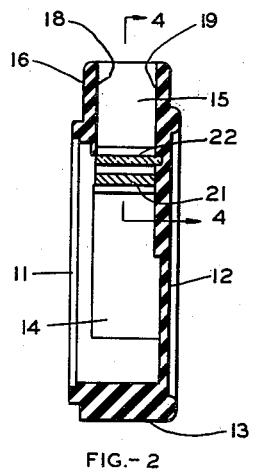
Fig. 2 is a sectional view taken on the line 2—2 of Fig. 1.

Figs. 1 and 2 illustrate the general construction of one form of my improved light meter. This includes a casing or housing 10 usually and desirably made in one piece by casting or molding hard rubber or a suitable plastic composition. The main body portion 11 is of general watch shape, or, in other words, of relatively thin round wafer form, having a thin flat back or bottom wall 12 and a peripheral side wall 13 enclosing or surrounding the chamber 14 in which the coils, magnet and other working parts (not shown) are mounted. The front of the chamber, of course, is closed by the dials, cover glass and other usual parts (also not shown).

Chamber 14, in the bare casting, communicates with a passage 15 in a hollow nose 16 which is more or less pointed by its external side surfaces 17, although its top and bottom surfaces 18, 19 are flat. Passage 15 terminates in an orifice or aperture 20 through which light rays reach the passage and travel through it to the light sensitive cell 21 located back of the glass or other transparent protecting window 22 at the inner end of the passage.

This arrangement provides a very light weight meter body, easy to manipulate, readily pointed, by use of its nose 16, at any desired field, and small enough to go into the vest pocket without objectionable bulk.

The light acceptance passage of an ordinary or conventional light meter of this kind, such as has been used heretofore, is usually of uniform rectangular cross section from end to end with the rectangular orifice or aperture at one end slightly larger than the rectangular area of the light cell to which light rays may be transmitted through the window at the other end. Of course, when considering modification of the shape of that passage to reduce or prevent reflection of light rays from its walls, some consideration must be given to other factors in the problem.

For example, if the meter is to remain relatively thin and flat, like a watch, no material change is possible, or at least practical, in the shape of the horizontal top and bottom surfaces 18, 19, of the passage walls, since the latter are already thin plates, although such wall surfaces could be of the same shape as the side walls later described, if desirable.

Again, while the cavity to form the passage may be widely flared inwardly, or extensively undercut, such an arrangement bulges the external contour of the nose, which desirably should be more or less pointed to serve in aiming the instrument at the field.

Further, the nose which contains the passage preferably should be molded in one piece even though the casing as a whole is open on one face to enable the working parts to be inserted or removed.

My improved meter case, accordingly, has been provided with a light acceptance passage whose form or contour takes all these factors into account, enabling the casing or housing to be molded or cast in one piece, preserving a neat and attractive external appearance and a pointed nose, but still with sufficient strength to withstand hard usage, and at the same time reducing to a material degree, and as far as is possible or practical, the undesirable effect of unwanted light rays, as will now appear.

Figure 5:
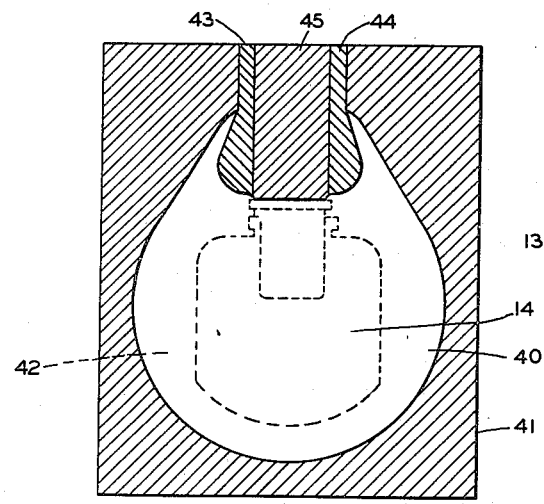
Fig. 5 is a detail view, somewhat diagrammatic, corresponding to Fig. 1, and showing certain parts used in casting or forming the housing.
Figure 3:
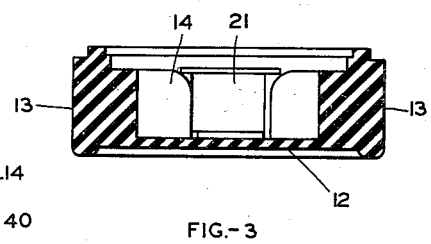
Fig. 3 is a similar view taken on the lines 3—3 of Fig. 1.
Figure 4:
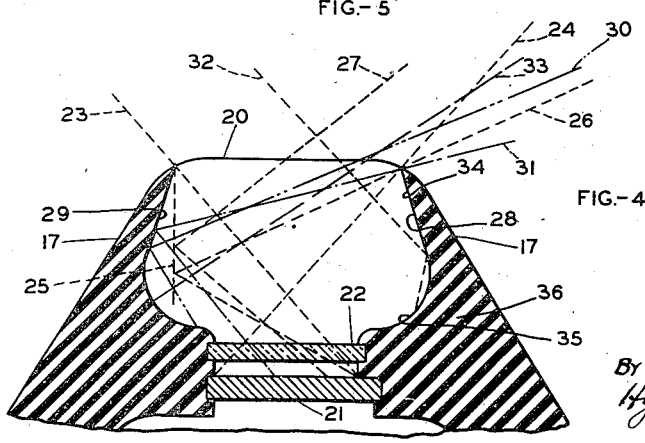
Fig. 4 is a detail sectional view, on a larger scale, on the line 4—4 of Fig. 2.

Referring to Fig. 5, it is apparent that the dotted lines 23, 24, subtend an angle including all light rays that reach the light sensitive cell directly, without reflection. This angle may be assumed to be that of the desired field. Further, were the side walls of the light transmitting passage straight, extending for example in the direction of the dotted line 25, such walls would transmit further light rays to the cell, by reflection from one surface, from points outside the desired field, such as rays traveling along the lines 26, 27.

I have quite considerably reduced the possibility of such rays reaching the light cell by reflection from the surfaces 28, 29 of the side walls of the light transmitting passage, by so forming those walls that said surfaces, or at least those portions thereof nearer to the orifice or aperture 20, diverge from the aperture toward the light cell. The consequence is that light rays striking those surfaces from points outside the desired field, but rather close to it, are reflected, not to the cell, but to another wall surface, having little if any effect upon the cell. Such a ray, for example is indicated by the dotted lines 30. The only rays that might reach the cell by one reflection from surfaces 28, 29, are those coming from points far out from the sides of the desired field, and along flatter or more obtuse angles, such as along the lines 31. These rays, of course, coming from more remote points, have relatively low light value and are of little importance, if any.

Further, the inner portions of wall surfaces 28, 29, have been so formed that they reflect any rays which impinge upon them, either to other surfaces, where they are absorbed, or back and out through the orifice itself, such as rays traveling along lines 32, 33.

Thus the complete wall surface, on each side of the passage, includes an outer portion 34, inclined fore and aft, and sloping outwardly from the cell as it approaches it, and an inner portion 35 which, in the specific embodiment shown, is curved or arched, focusing, generally speaking at a point outside the passage. Accordingly, as to these two side walls, they are designed to either absorb unwanted light rays, originating outside the desired field, or to reflect them away from the cell.

At the same time, the form or shape of a passage embodying my invention takes into consideration other factors, such as those before referred to.

For example, the undercutting caused by the diverging or sloping side walls of the passage is not so great as to disturb the external contour of the nose as a whole, which remains pointed and useful in aiming, while retaining full wall thickness from front to rear. Indeed, the curved inner portions of the wall surfaces provide thickened portions 36 which strengthen and reinforce the walls where they join the body.

Again, Fig. 5 illustrates how it is still possible to form the casing by a press molding operation, but in one piece. The mold cavity 40 is in a steel block 41 into which a disc form core piece, indicated by the dotted line 42, is introduced for forming the main housing cavity or chamber 14. This core piece may be withdrawn by upward motion transverse to the general plane of the housing in the ordinary manner. The light transmitting passage is formed by a core consisting of two side pieces 43, 44, left and right, and a center piece 45. After the molding operation is finished, the center piece 45 is first taken out, endwise. Then the two side pieces 43, 44 are moved into the space formerly occupied by the center piece and are withdrawn separately, endwise, like the end piece. This well known manner of molding the nose of the case in one piece of course limits the form and lateral dimensions which the light transmitting passage may take.

In order to accurately determine the beneficial advance of my improved construction over a like device having a passage with straight-side walls, two meters, complete, of the two forms, with light transmitting passages covering like fields of vision, were operated side by side under like conditions, pointing both meters at the sky to secure a uniform light field. It was observed that the meter with the straight-side wall passage indicated ¾ of a stop higher, or 75% increase in total light sensitivity, over the indication from the meter of my invention, as shown and described.

What I claim is:

1. A passage wall structure for a light meter of the character described wherein a light sensitive device is disposed within said passage and spaced inwardly from the outer end of said passage, said outer end defining a light acceptance aperture, said wall structure comprising opposed wall surfaces having portions diverging from said aperture to a location intermediate said aperture and said device, and then converging again from said location towards said device.

2. A passage wall structure for a light meter of the character described wherein a light sensitive device is disposed within said passage and spaced inwardly from the outer end of said passage, said outer end defining a light acceptance aperture, said wall structure comprising opposed wall surfaces having portions diverging from said aperture to a location intermediate said aperture and said device, and then converging again from said location towards said device, the convergent portions of said wall surfaces being curved on an arc which in general focuses at a point outside the passage.

3. A passage wall structure for a light meter of the character described wherein a light sensitive device is disposed within said passage, and spaced inwardly from the outer end of said passage, said outer end defining a light acceptance aperture, said wall structure comprising opposed wall surfaces having portions diverging from said aperture in relatively flat planes to a location intermediate said aperture and said device, and then converging again from said location towards said device in a smooth curve concave towards said aperture.

4. A passage wall structure for an article wherein light rays are transmitted through a passage, and received by an element at the inner end of said passage, and wherein said element is intended to receive only light rays from a limited angular field of view external to said passage, the outer end of said passage defining a light acceptance aperture, said wall structure comprising wall portions diverging from said aperture in relatively straight lines to a passage wall location intermediate said aperture and said element, and then converging again along relatively curved lines, concave outwardly, from said location towards said element.

ROBERT D. HICKOK.

REFERENCES CITED

The following references are of record in the file of this patent:

UNITED STATES PATENTS

| Number | Name | Date |
|---|---|---|
| 1,764,368 | Thomas | June 17, 1930 |
| 1,917,379 | Lowry | July 11, 1933 |
| 2,013,363 | Riszdorfer | Sept. 3, 1935 |
| 2,016,469 | Weston | Oct. 8, 1935 |

OTHER REFERENCES

The British Journal of Photography, March 13, 1946, pages 164–165; 88–1(J).